United States Patent [19]

Slovensky, Jr.

[11] 3,965,564

[45] *June 29, 1976

[54] METHOD OF MAKING A LATCHING ASSEMBLY

[75] Inventor: Mike J. Slovensky, Jr., Twinsburg, Ohio

[73] Assignee: Cleveland Hardware & Forging Co., Cleveland, Ohio

[ * ] Notice: The portion of the term of this patent subsequent to Sept. 10, 1991, has been disclaimed.

[22] Filed: Mar. 24, 1975

[21] Appl. No.: 561,350

Related U.S. Application Data

[60] Division of Ser. No. 483,110, June 26, 1974, Pat. No. 3,910,611, which is a continuation of Ser. No. 237,715, March 24, 1972, Pat. No. 3,834,747.

[52] U.S. Cl. .................................. 29/434; 29/452; 29/469

[51] Int. Cl.[2] .......................................... B23P 19/00

[58] Field of Search ..................... 29/434, 452, 469; 292/38, DIG. 31, DIG. 36, 54, 171; 70/208

[56] References Cited

UNITED STATES PATENTS

| | | | |
|---|---|---|---|
| 797,425 | 8/1905 | Haag | 292/171 X |
| 1,603,379 | 10/1926 | Dautrick | 292/DIG. 36 UX |
| 1,724,995 | 8/1929 | Dautrick | 292/DIG. 36 UX |
| 2,022,718 | 12/1935 | Heins | 292/38 |
| 2,040,080 | 5/1936 | Collins | 292/DIG. 36 UX |
| 2,389,315 | 11/1945 | Kerr | 292/38 X |
| 2,900,204 | 8/1959 | Pelcin | 292/173 |
| 3,055,204 | 9/1962 | Pelcin | 70/153 |
| 3,283,549 | 11/1966 | Mees | 70/208 X |

*Primary Examiner*—Charlie T. Moon
*Attorney, Agent, or Firm*—John H. Mulholland

[57] ABSTRACT

The specification and drawings disclose a multiple latch assembly particularly suited for use in contoured vehicle doors. The disclosed assembly includes a plurality of latch members each having an outwardly biased latch pin. Operatively connected to all of the latch pins is a common operating assembly including a case defining a cavity and a handle pivotally mounted between the sides of the cavity. A slide member is carried on the case and interconnects with the handle so that oscillation of the handle produces reciprocation of the slide member. Lengths of flexible actuating cable are connected between the slide member and each of the latch pins. Each length of cable is arranged so that movement of the slide member in one direction will produce simultaneous inward movement of all latch pins.

1 Claim, 8 Drawing Figures

METHOD OF MAKING A LATCHING ASSEMBLY

CROSS-REFERENCES TO RELATED APPLICATIONS

This application is a division of application Ser. No. 483,110, filed June 26, 1974, now U.S. Pat. No. 3,910,611 which is a continuation of Ser. No. 237,715, filed Mar. 24, 1972 now U.S. Pat. No. 3,834,747.

BACKGROUND OF THE INVENTION

The subject invention relates to an improved multiple latch and operating mechanism for doors.

The invention is particularly adapted for use in connection with contoured doors of truck bodies and the like and will be described with particular reference thereto; however, as will become apparent, the invention is capable of broader application and could be used in many types of doors.

In the large access doors often used on delivery vans and similar vehicles, it is often necessary to have several latch bolts actuated from a common operating handle. For example, a latch may be located on each of the three non-hinged edges of each door. The operating handle is located at a central position in the door and, in the past, has been connected to the individual latches through rigid bars. A cam plate mechanism moved by the operating handle reciprocated the bars to positively extend and withdraw the latch bolts.

The described multiple latch mechanism functioned satisfactorily for most uses; however, it did have certain disadvantages. For example, the stroke of the latches was controlled by the configuration of the cam plate. To change the latch stroke as was sometimes required for different installations, it was necessary to redesign the cam plate. An additional problem was that the mechanism cannot readily be used in contoured door assemblies. This is because the actuating bars must generally be in a single plane throughout their length. In the relatively thin contoured doors, this was not possible. If used at all, special curved actuating bars and guides were required for each different installation.

BRIEF DESCRIPTION OF THE INVENTION

The subject invention overcomes the above-discussed problems and provides a highly simplified multi-latch assembly. In general, assemblies formed in accordance with the invention include a plurality of latch members each having an outwardly biased latch pin. Operatively connected to all of the latch pins is a common operating assembly including a case defining a cavity and a handle pivotally mounted between the sides of the cavity. A slide member is carried on the case and interconnects with the handle so that oscillation of the handle produces reciprocation of the slide member. Lengths of flexible actuating cable are connected between the slide member and each of the latch pins. The invention also contemplates that each length of cable will be arranged so that movement of the slide member in one direction will produce simultaneous inward movement of all latch pins.

Preferably, when the assembly is used in contoured doors, the lengths of cable are connected over suitable guide means such as pulleys. The combination of the biased latch pins and the flexible cable allows the mechanism to be used in substantially any shape door without modification. Merely by adjusting cable length and positioning cable guides at the proper locations, any needed configuration or layout can be provided. Additionally, the length of latch pin travel can be varied merely by providing pin stops as needed. This is a distinct advantage as compared with the prior cam actuated assemblies and permits great freedom in latch pin and actuating handle layout.

As can further be seen, the actuating assembly, cables and latches can be at substantially any angle relative to one another. However, the thickness of the door or its contour does not affect use of the assembly.

Accordingly, a primary object of the invention is the provision of multiple latch assembly of the general type described which can be used in a wide variety of doors.

A further object is the provision of a multiple latch assembly in which the latches are non-rigidly connected with the operating mechanism.

Yet another object is the provision of a latch assembly of the type discussed which allows substantial freedom in door design and, latch and operating handle place.

Still another object is the provision of a door latch operating assembly which is simple to construct and reliable in operation.

BRIEF DESCRIPTION OF THE DRAWINGS

The above and other objects and advantages will become apparent from the following description when read in conjunction with the accompanying drawings wherein:

Referring more particularly to the drawings wherein the showings are for the purpose of illustrating a preferred embodiment of the invention only and not for the purpose of limiting the same, FIGS. 1 and 2 illustrate a preferred form of multiple latch assembly 10 installed on a contoured door 12 of the type often used in delivery vans, panel trucks or the like vehicles. In the embodiment under consideration, the door is mounted for pivotal movement about a generally vertically extending edge. A peripheral seal strip 14 extends about the edges of the door and sealingly engages a lip or stop 16 formed about the door opening 18. The details of the door and door opening are relatively conventional and further description appears unnecessary.

Of importance to the invention is the arrangement of the latch pin and operating assembly. The number of latch pins used, as well as, their placement can vary widely; however, in the embodiment under consideration, the assembly includes three latch pin units 20, 21 and 22. The latch pin units 20–22 are shown mounted on the inner side of the three unhinged edges of the door 12. Preferably, and in accordance with the invention the latch pin assemblies are simultaneously actuated between extended and withdrawn positions by a common operating handle assembly 23.

Figure 4:
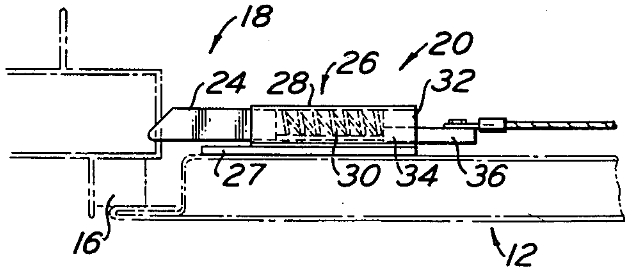
FIG. 4 is a cross-sectional view taken on line 4—4 of FIG. 2.

Although the latch pin assemblies 20 through 22 could vary, in the subject embodiment, they are all of identical construction. As best shown in FIGS. 4 and 4a, each of the assemblies 20 through 22 preferably include a latch pin member 24 reciprocally mounted in a housing 26. In the construction illustrated, the housing 26 includes a base plate 27 and a generally U-shaped cover member 28 joined to the base plate in any convenient manner, such as by welding. The cover plate 28 and the base plate 27 define a generally rectangular guideway 25 for the pin 24.

The pin member 24 is continually maintained under an outwardly directed bias by a spring means 30 carried within the guideway. The spring is positioned between the inner end of the latch pin member 24 and end member 32 carried within the cover plate 28.

As best shown in FIG. 4, a drive bar 34 extends through the housing 26 and is formed integrally with, or joined to, the under side of the inner end of the latch pin 24. Bar 34 extends through the housing and has an outer end portion 36 which engages the stop block 32 to limit the amount of outward movement of the latch pin 24.

As previously mentioned, each of the latch pin assemblies 20 through 22 are of identical construction. They are mounted on the interior of the door 12 with their latch pins extending outwardly as shown. Suitable openings are formed or mounted in the frame of the door opening and receive the latch pins when they are in the outward position shown in FIG. 4. As can be appreciated, the latch pins are maintained biased outwardly by the springs 30; however, to withdraw them for door opening operation, the subject invention proposes to interconnect all of the latch pin assemblies 20 through 22 with the common operator 23. In particular, each of the latch pins is connected to a length of flexible cable or the like (see FIGS. 2 and 3). Note that a first length of cable 40 extends from latch bolt assembly 20 to the operating assembly 23. Similar lengths of cable 42 and 44 extend from latch bolt assemblies 21 and 22 respectively.

Figure 5:
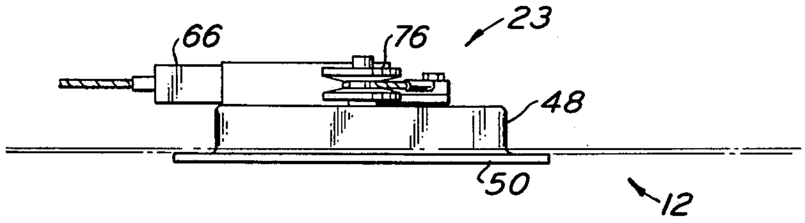
FIG. 5 is a cross-sectional view taken on line 5—5 of FIG. 2.
Figure 6:
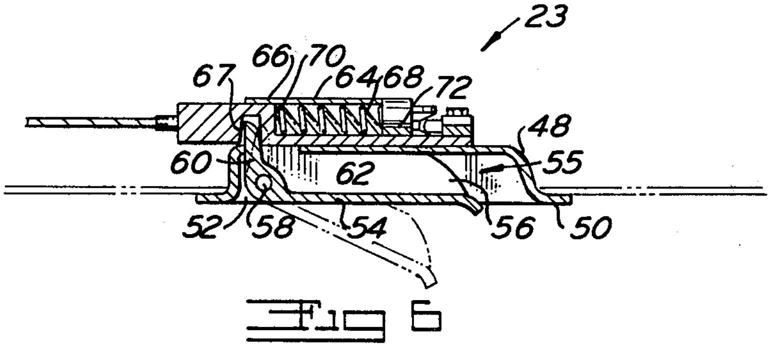
FIG. 6 is a cross-sectional view taken on line 6—6 of FIG. 2 and showing the operating handle assembly in detail; and, FIGS. 7 and 8 are views similar to FIG. 2 but showing modified form of the invention.

Operating assembly 23 is arranged to simultaneously withdraw all three latch bolt assemblies. Although the operating assembly 23 could take different forms, it is illustrated as a flush mounted, lever operated type of actuator and, is preferably formed as illustrated in FIGS. 5 and 6. As shown, the assembly 23 is what is commonly referred to as a flush-type actuator and is arranged to extend inwardly of the outer surface of the door so that there are no exposed handle operating parts or the like. In general, the assembly shown includes a first generally dish-shaped housing member 48 which is received in the outer face of the door 12. A peripheral flange 50 extends about the number 48 and is connected to the door by welding or the like. Mounted within the housing member 48 for pivotal movement on a pivot pin 58 which extends between the sides of housing 48 is an operating handle 54. A pair of side flanges 56 are formed on handle 54 to provide a stop for the inward movement of the handle and a recess 55 in which the hand can be inserted for operating the handle. Extending laterally from handle 54 through an opening 61 formed in housing 48 is a finger 60.

Carried on the back surface of housing 48 is a channel shaped member 64 having lateral flanges 65 which are joined to the housing member 48. Channel shaped member 64 defines an enclosed guideway 69 having a generally rectangular cross-section. A rectangular bar 66 is mounted for reciprocation in guideway 69. Bar 66 includes a recess 67 shaped generally as shown in FIG. 6 and receiving the finger 60 of operating lever 64. The bar 66 is continually biased to the left (as viewed in FIG. 6) by a coil spring 68 which acts between shoulder 70 and stop 72. Stop 72 is merely a depressed portion of member 64.

Figure 1:
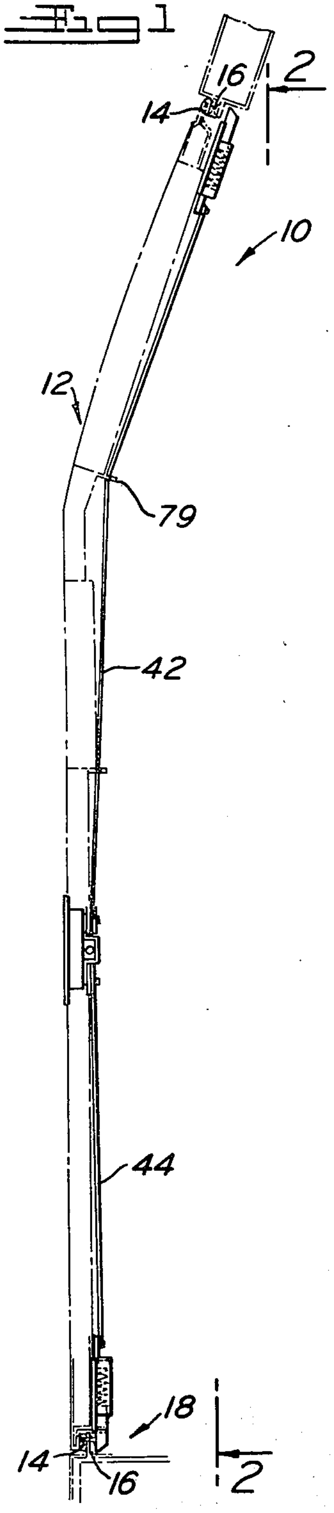
FIG. 1 is a side elevation of a multipoint latch assembly formed in accordance with a preferred embodiment of the invention (the assembly is shown mounted on a contoured door illustrated by dot-dash lines)
Figure 2:
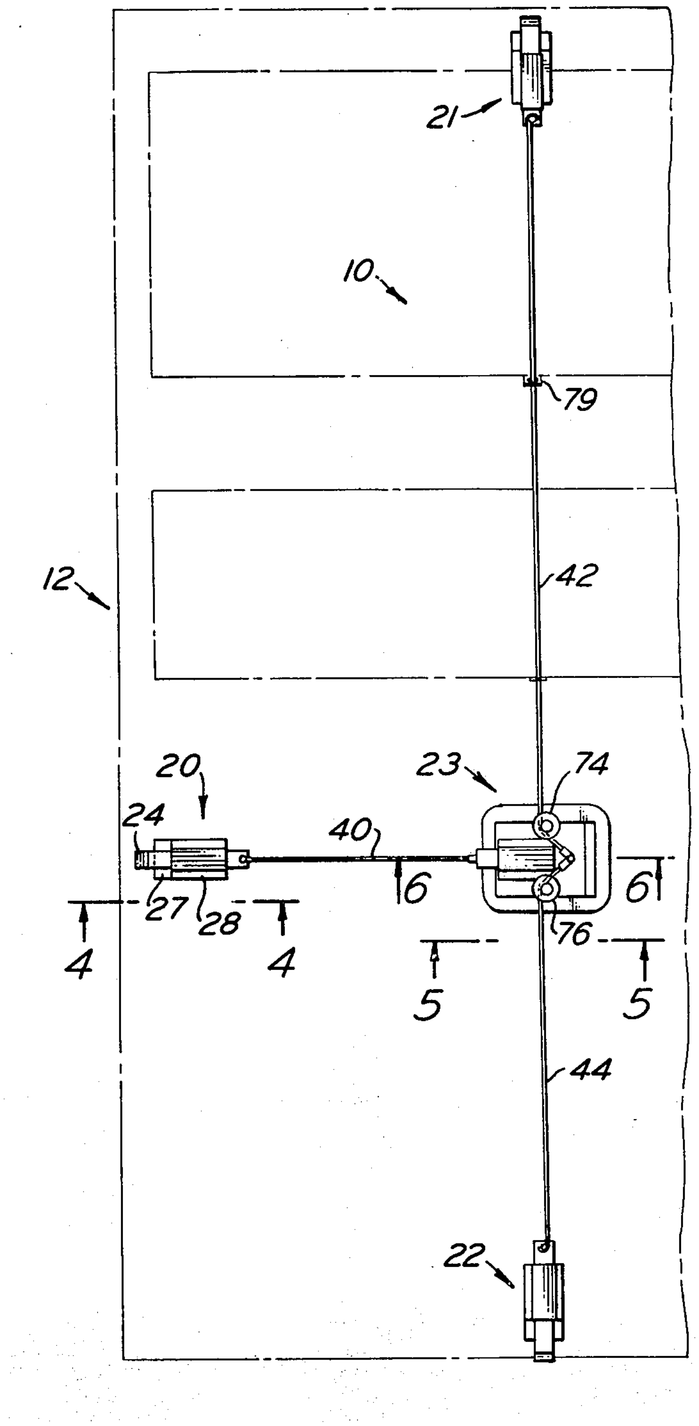
FIG. 2 is a view taken on line 2—2 of FIG. 1.
Figure 3:
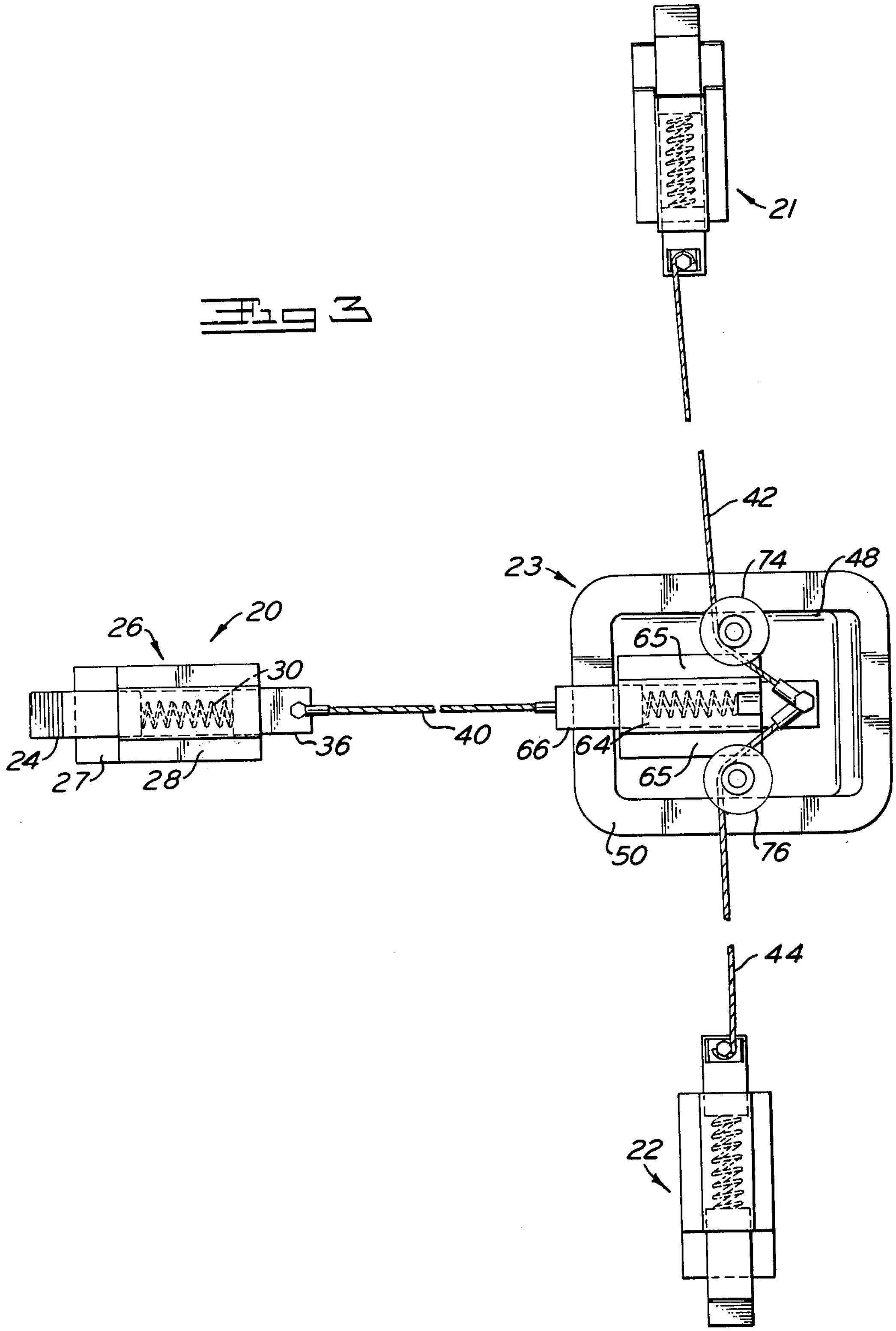
FIG. 3 is an enlarged view similar to FIG. 2.

As best shown in FIGS. 2 and 3, cable 40 is connected to the left hand end of the bar 66. Cables 42 and 44 are connected to the right hand end in any convenient manner such as by being attached to a threaded stud 71. Notice that cables 42 and 44 pass about suitable guide pulleys 74 and 76 respectively. The guide pulleys are rotatively mounted on shafts joined to the back of housing 48.

As is apparent, operation of handle 54 to the dotted-line position of FIG. 6 causes bar 66 to be actuated to the right. This causes all three latch bolts to be actuated inwardly against the bias of their respective springs 30. Release of handle 54 permits the latch pins to move outwardly under the influence of their springs and returns the handle to its solid line position.

Because of the flexible cable interconnections between the operating assembly 23 and the latch bolt assemblies 20–22, the various assemblies can be positioned in substantially any desired relative orientations. All that is necessary is that suitable guides be provided for the cable. For example, in the subject embodiment, cable 42 is required to pass through a guide plate 79 because of the contour of door 12. Other guide means such as small pulleys could be used if desired.

Figure 7:
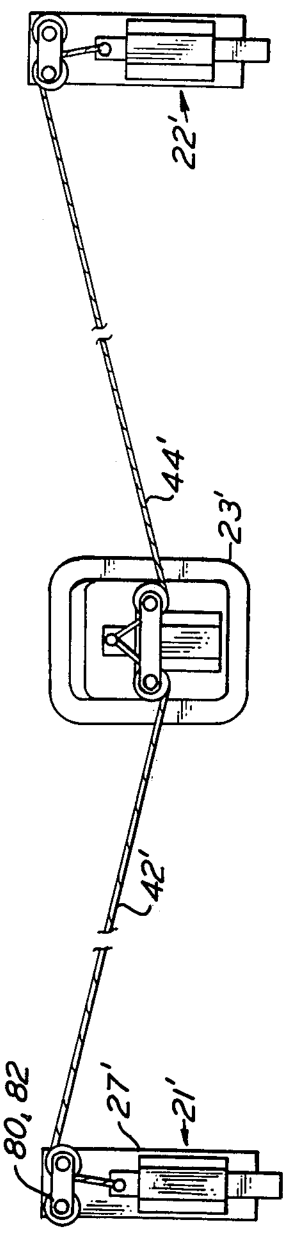
Figure 8:
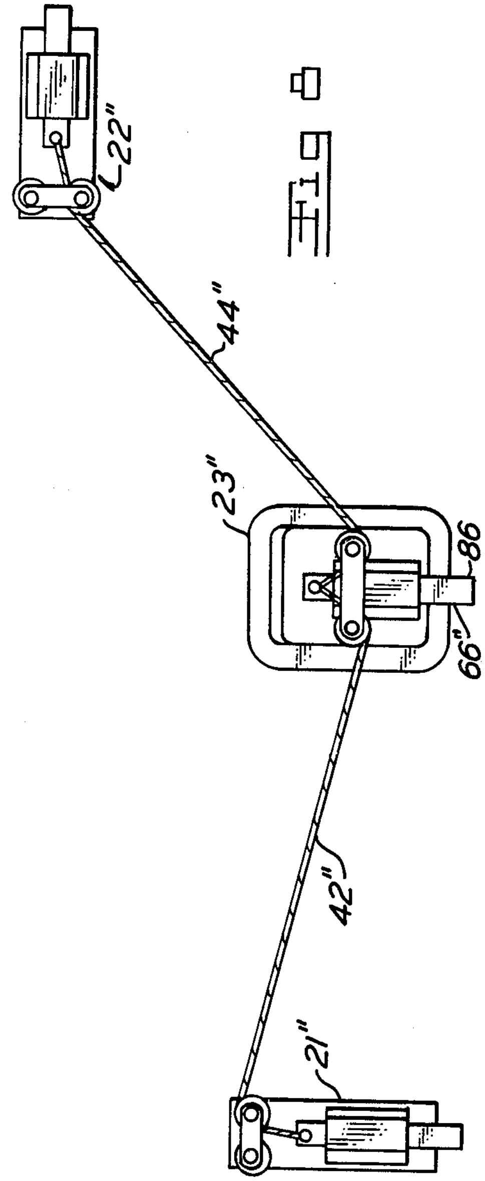

FIGS. 7 and 8 further illustrate the flexibility of the invention and the manner in which it permits variation in the spacial relationships between the latch pin assemblies and the operating assembly. The embodiments shown in FIGS. 7 and 8 are broadly similar to that shown in FIGS. 1 thru 6. Accordingly, the corresponding reference numerals differentiated by prime (′) and double prime (″) suffixes will be used to identify similar components. The description of one such component is to be taken as equally to the others unless otherwise noted.

In particular, the embodiment of FIG. 7 shows how two latch pin assemblies 21′ and 22″ can be arranged to operate in parallel along a single edge of a door with the operating assembly 23′ located at some intermediate point. In this embodiment, the operating assembly 23′ is shown as having exactly the same construction as that described with reference to assembly 23 of FIGS. 1 thru 6 embodiment. The latch pin assemblies 21′ and 22′ however, differ from the latch pin assemblies in the FIGS. 1 thru 6 embodiment in that the base plates 27′ are somewhat larger and carry a pair of spaced rollers 80, 82. The rollers 80, 82 are rotatively mounted from suitable pins extending outwardly from the base 27 prime. The use of the rollers 80, 82 serve to guide the cable and the individual latch pin assemblies to be mounted in substantially any desired relationship relative to each other and the operating assembly. Several such arrangements are shown dotted in the figure.

As can be appreciated, the arrangement of the operating assembly, the cables and the guide pulleys permits the transfer of the reciprocal motion of the bar 66′ to be converted into linear motion in substantially any direction relative to the bar. There are, of course, no substantial limitations on the placement of the latch pin assemblies.

The embodiment shown in FIG. 8 is closely similar to the FIG. 7 embodiment with the difference that the operating assembly 23'' has its bar member 66'' shaped and arranged to serve as an additional latch pin member. Note that the lower end 86 of the bar member 66'' has an inclined surface corresponding in general to the shape of the latch pins. In this embodiment, as in the FIG. 7 embodiment, each of the latch pin assemblies is provided with spaced pairs of rollers so that the latch pin assemblies can be readily shifted to have different orientations.

The invention has been described in detail sufficient to enable one of ordinary skill to make and use the same. Obviously, modifications and alterations will occur to others upon a reading and understanding of the specification and it is my intention to include all such modifications and alterations as part of my invention insofar as they come within the scope of the appended claims.

What is claimed is:

1. A method of providing a manually operative latching assembly for a door comprising the steps of:

a. providing a plurality of latch members having latch pins movable between inward and outward directions and continually biased in the outwardly direction;

b. providing an operating assembly including a pivotally mounted substantially flush handle driving a reciprocating sliding member;

c. positioning said latch members along marginal edges of the door at locations wherein said latch pins can engage keepers;

d. positioning said operating means at a desired location on said door;

e. interconnecting said sliding member with said latch pins by lengths of flexible cable; and f. tensioning said lengths of cable an amount sufficient to allow said latch pins to move simultaneously upon movement of said sliding member but not an amount sufficient to hold said pins in retracted position.

* * * * *